United States Patent [19]

Löbel et al.

[11] Patent Number: 5,698,116

[45] Date of Patent: Dec. 16, 1997

[54] ELECTRIC WELDING DEVICE USING WELDING MATERIAL SUPPLIED IN A WET ENVIRONMENT

[75] Inventors: Peter Löbel, Toppenstedt; Willi Punessen, Geesthacht; Peter Szelagowski, Elmshorn, all of Germany

[73] Assignee: GKSS-Forschungszentrum Geesthacht GmbH, Geesthacht, Germany

[21] Appl. No.: 617,742

[22] PCT Filed: Sep. 2, 1994

[86] PCT No.: PCT/DE94/01010

§ 371 Date: Mar. 7, 1996

§ 102(e) Date: Mar. 7, 1996

[87] PCT Pub. No.: WO95/07164

PCT Pub. Date: Mar. 16, 1995

[30] Foreign Application Priority Data

Sep. 7, 1993 [DE] Germany ............. 43 30 157.6

[51] Int. Cl.⁶ ........................................ B23K 9/00
[52] U.S. Cl. ................... 219/72; 219/136; 219/137.2
[58] Field of Search .................... 219/72, 74, 136, 219/137 R, 137.2

[56] References Cited

U.S. PATENT DOCUMENTS

| 2,572,796 | 10/1951 | Woodard | 219/137 R |
| 3,892,937 | 7/1975 | Paton et al. | 219/72 |
| 4,035,602 | 7/1977 | Berghof | 219/72 |
| 4,039,798 | 8/1977 | Lythall et al. | 219/72 |
| 4,139,758 | 2/1979 | Pinfold | 219/72 |

FOREIGN PATENT DOCUMENTS 2136721  9/1984  United Kingdom.

*Primary Examiner*—Clifford C. Shaw
*Attorney, Agent, or Firm*—Robert W. Becker & Associates

[57] ABSTRACT

An electric welding device using welding or filler material supplied to a welding site located in a wet environment. The device provides for the supply of the welding material to the welding site in a water-free environment that extends up to the welding site.

11 Claims, 1 Drawing Sheet

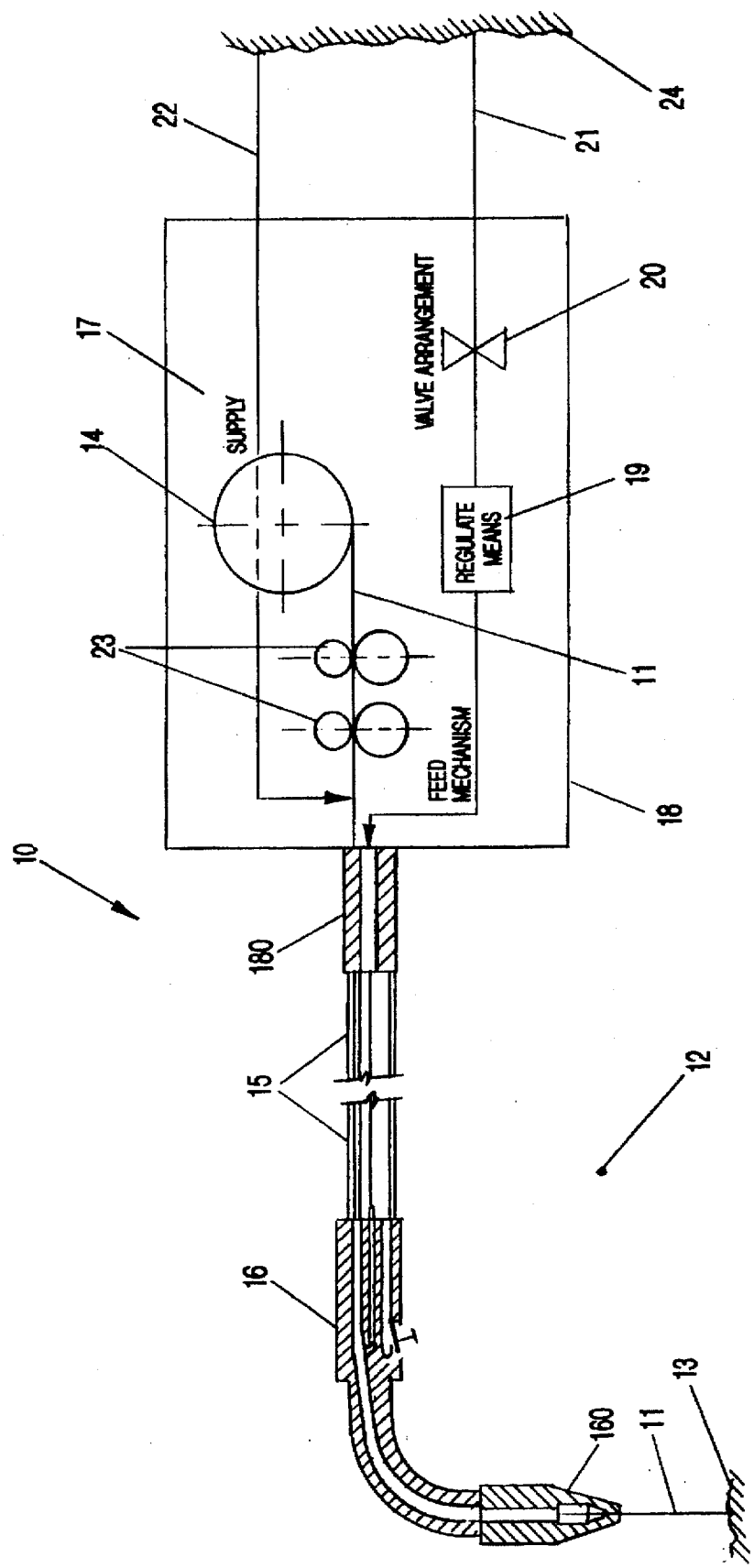

ELECTRIC WELDING DEVICE USING WELDING MATERIAL SUPPLIED IN A WET ENVIRONMENT

BACKGROUND OF THE INVENTION

The present invention relates to an electric welding device using welding material or filler that is supplied in a wet environment.

Electric welding under water, i.e. in a directly wet environment, has been carried out for many years with greater or lesser success. Independently of whether the electric welding is effected manually or automatically in a wet environment, weld joints of satisfactory quality have been effected to depths of about ten meters below the surface of the water. However, the quality of a weld joint is reduced very rapidly as the surrounding pressure increases, i.e. as the depth in the water in which the electric welding is to be carried out becomes greater. The increasing loss in quality of the weld joints as the surrounding pressure or depth becomes greater can be predominantly attributed to the dissociation of the water into hydrogen and oxygen due to the electric arc that is generated at the welding site. The greater the surrounding pressure at the welding site, the greater is the effect of the hydrogen and the oxygen upon the quality of the weld joint.

It is an object of the present invention to provide a device with which even at very great water depth, i.e. at a high surrounding pressure, a weld joint quality that satisfies high quality standards can be achieved independent of the selected depth and hence independent of the surrounding pressure at any given time, whereby the device should also be easy to operate and easy to manufacture.

SUMMARY OF THE INVENTION

This object is realized pursuant to the invention by embodying the device in such a way that the material for welding can be supplied to the welding site in a water-free environment that extends up to the welding site.

The essential advantage of the resolution proposed by the present invention is that the welding material is kept entirely water free up to the site (electric arc) where the welding takes place. Furthermore, with the inventively proposed resolution, at a great depth, i.e. at a high surrounding pressure, an increased penetration of water, due to pressure, into a flux material that can already be present in the supplied welding material, is advantageously avoided. Such flux are normally very hygroscopic and would normally lead to a further worsening of the quality of the weld joint in a wet environment were the inventively proposed measures not carried out.

A further important advantage is that the welding process results in a considerable improvement of the welding material (an improvement with respect to strength of the welding material).

Pursuant to one advantageous specific embodiment of the device, the welding material can be supplied from a weld supply that is disposed remote from the welding site. This embodiment has the advantage that under water it is possible to operate in a manner free of obstacles since the welding material does not obstruct the work due to the removed arrangement.

It is particularly advantageous to guide the welding material to the welding site in a hose-like connection, making possible a very straightforward yet effective embodiment of the device in order to avoid contact of the welding material with the surrounding water.

In principle, it is possible to let the welding material discharge into the wet environment directly at the welding site in any desired sealed manner, for example from a welding gun, and furthermore for example by means of a mechanical seal that prevents the surrounding water from penetrating into the hose-like connection. However, since the device is designed to operate with great success substantially independent of the selected water depth, and since such mechanical seals can be produced only at great expense in order to provide a seal over the entire possible pressure range of the surrounding water, it is proposed pursuant to a further advantageous specific embodiment that in the hose-like connection an inner pressure of the internal medium that is greater than that of the outer surrounding pressure be built up so that due to the previously described pressure relationship water can never penetrate into the interior of the hose-like connection and thus a moistening of the welding material with water is prevented in a straightforward manner.

Pursuant to yet another advantageous specific embodiments of the device, the welding material can be supplied from a pressure tight container that accommodates the supply of welding material. In such a case, the pressure tight container is connected by the hose-like connection to the actual welding apparatus, for example a welding gun, whereby advantageously the inner pressure of the internal medium that can be built up in the hose-like connection and/or in the container can always be maintained greater than the surrounding pressure, as a function of such external surrounding pressure, via a regulating means. For this reason, the container advantageously also needs to be only mechanically stable such that the aforementioned pressure relationship is fulfilled, whereby the respective internal pressure need be only slightly greater than the external pressure in order to prevent water from penetrating into the hose-like connection and the container.

In principle, the internal medium for the container and/or the hose-like connection can be made available at the site under water by appropriate medium supplies in the form of bottles. However, the internal medium is advantageously introduced from the outside into the hose-like connection and/or the container by means of a hose connection, whereby the medium can even be directly generated at the surface of the water and can then be conveyed to the container and the hose-like connection via a further hose-like connection.

The supply of internal medium into the container and/or into the hose-like connection is advantageously effected via an operable valve mechanism that is disposed in or on the container and is manually actuated, possibly even by the regulating means, in order to maintain the aforementioned pressure relationship between the internal pressure and the surrounding pressure.

The internal medium itself can in principle be any desired gas, with the least expensive internal medium, because it is readily available, preferably being air. However, the internal medium can also be an inert gas when the highest quality weld joints are involved.

Finally, the welding material can be supplied by the device to the welding site with a prescribed feeding action thus always ensuring that for example upon discharge of the welding material from the welding gun a minimum possible surface of the welding material in fact comes into contact with the surrounding water, or by this measure makes possible further improvement of the quality of the weld joint.

3

In this connection, a feed mechanism for the welding material is preferably disposed in the container; such a feed mechanism can be driven, for example, by an electric motor and can be manually or also automatically controlled.

BRIEF DESCRIPTION OF THE DRAWING

With the aid of the single schematic drawing, the invention will now be described in detail in conjunction with one exemplary embodiment. The drawing shows:

a side view of a welding gun out of which is discharged the wire-shaped welding material, with the welding gun being connected by a hose-like connection to a container in which the welding material supply as well as a feed mechanism for the supply of the welding material as well as a regulating means are disposed, whereby the regulating means ensures a proper control of the interior chamber pressure of an internal medium disposed in the container and the hose-like connection.

DESCRIPTION OF PREFERRED EMBODIMENTS

The device 10 essentially comprises a welding gun 16 of a type known per se however provided with a watertight control head and a pressure tight container 18. The container 18 and the welding gun 16 are interconnected in a pressure tight manner relative to the surrounding medium by means of a hose-like connection 15. The length of the hose-like connection can be suitably selected as desired as a function of the welding that is intended to be carried out, and itself has no influence upon the designed function of the device 10.

The drawing shows that there is disposed in the container 18 a supply 14 of welding material or filler, with the supply being in the form of a drum upon which the welding material 11 is wound in a manner known per se.

Any suitable wire-like welding material can be utilized as the welding material 11, and in particular as a solid wire or also as a seamless or rolled tubular wire in which flux can be accommodated in a normal fashion. It should be noted that the design function of the device 10 is independent of the type of welding material 11 utilized, so that no further detail needs to be provided therefor at this point. The end of the welding material 11 that comes from the supply 14 of welding material is guided over a schematically illustrated feed mechanism 23 and is guided via a connector 180 at the side of the container through the hose-like connection 15 to the welding gun 16, whereupon the welding material 11 then exits the head 160 of the gun directly in front of the welding site 13.

The feed mechanism 23, which can be driven by an electric motor and manually or automatically controlled, all by means not separately shown here, ensures a continuous supply of the welding material 11 through the hose-like connection 15 and via the welding gun 16 and through the head 160 of the gun to the welding site 13.

Either from an above water site 24 or from a supply that is not separately shown here and is in the immediate vicinity of the wet environment 12 of the device 10, a medium, such as air, an inert gas, an inert gas/air mixture, an inert gas/oxygen mixture, or an inert gas/CO/$CO_2$ mixture, is supplied via a medium supply means 21 into the container 18 via a valve arrangement 20 that is disposed within or externally of the container 18. A regulating means 19 that can be disposed in the container 18 as illustrated, but in principle can also be disposed externally of the container 18

4 and possibly even at the above water site 24, ensures that in the container 18 and in the interior of the hose-like connection and up to within the head 160 of the welding gun 16, an internal medium pressure is established that is always greater than the ambient pressure of the wet environment 12. The regulating means can thus ensure that independent of the external pressure at any given time, the relationship internal medium pressure≧ambient pressure is fulfilled.

In order to prevent water from the wet environment 12 from penetrating through the head 160 of the welding gun into the welding gun 16, into the hose-like connection 15, and/or into the container 18, it is merely necessary to maintain the pressure of the internal medium 17 in the sense of the aforementioned relationship. For this reason, the container 18 can also have a relatively lightweight construction, since independently of the depth of insertion into the wet environment 12 the container can be utilized with a possibly constantly regulated differential pressure and hence independent of the surrounding pressure.

In summary, by transporting the welding material 11 from the supply 14 of welding material to discharge out of the head 160 of the gun, a water-free supply is ensured since only that end of the welding material 11 that at any given time exits the head 160 of the gun comes into contact with the wet environment and hence only shortly prior to entry of the welding material into the electric arc does an immersion in water occur, the result is that pursuant to the present invention an extremely minor wetting with water occurs so that the effect upon the weld seam or joint is therefore slight.

With the device 10 of the present invention, it is not only possible to effect a manual welding operation in the wet environment 12, but rather the device 10 is also especially suitable for a partially or fully automatic welding operation in the wet environment 12.

The present invention is, of course, in no way restricted to the specific disclosure of the specification and drawing, but also encompasses any modifications within the scope of the appended claims.

LIST OF REFERENCE NUMERALS 10 device
11 welding material
12 wet environment
13 welding site
14 supply of welding material
15 hose-like connection
16 welding gun
160 head of gun
17 internal medium
18 container
180 connector
19 regulating means
20 valve mechanism
21 medium supply means
22 supply of welding arc voltage
23 feed mechanism
24 above water site

What we claim is:

1. An electric welding device using welding material supplied to a welding site located in a wet environment, comprising:

means for supplying said welding material to said welding site in a water-free environment that extends up to said welding site, wherein a hose-like connection is provided for guiding said welding material to said welding site and wherein said hose-like connection is provided with an internal medium that provides an inner pressure that is greater than the external surrounding pressure of said wet environment for preventing water from entering said hose-like connection; and regulating means for maintaining said inner pressure always greater than said external surrounding pressure of said wet environment.

2. A device according to claim 1, wherein welding material supply means are disposed removed from said welding site for the supply of said welding material.

3. A device according to claim 2, wherein a pressure-tight container is provided for accommodating said supply means for said welding material.

4. A device according to claim 3, wherein a regulating means is provided for regulating the internal pressure of said internal medium in at least one of said hose-like connection and said container, with said regulating device regulating said internal pressure of said internal medium as a function of said external surrounding pressure and maintaining said internal pressure so that it is always greater than said surrounding pressure.

5. A device according to claim 4, wherein means are provided for introducing said internal medium from the outside into at least one of said hose-like connection and said container.

6. A device according to claim 5, wherein a valve mechanism is provided for controlling the supply of said internal medium.

7. A device according to claim 3, wherein means are provided for conveying said welding material to said welding site with a prescribed feeding action.

8. A device according to claim 7, wherein said means for conveying comprises a feed mechanism for said welding material, said feed mechanism being disposed in said container.

9. A device according to claim 2, wherein said internal medium is air.

10. A device according to claim 2, wherein said internal medium is inert gas.

11. A device according to claim 2, wherein said internal medium is selected from the group consisting of an inert gas/air mixture, an inert gas/oxygen mixture, and an inert gas/CO/$CO_2$ mixture.

* * * * *